United States Patent
Lai et al.

[11] Patent Number: 5,950,657
[45] Date of Patent: Sep. 14, 1999

[54] MODULATING ACTION NON-FLOWING PILOT OPERATED RELIEF VALVE

[75] Inventors: Ying Lai; Erwin Cortez, both of N. Royalton, Ohio

[73] Assignee: Teledyne Industries, Inc., Los Angeles, Calif.

[21] Appl. No.: 09/076,493

[22] Filed: May 12, 1998

[51] Int. Cl.[6] .................................................. G05D 7/00
[52] U.S. Cl. ................ 137/102; 137/627.5; 137/625.69; 137/625.66
[58] Field of Search ............................ 137/627.5, 625.69, 137/625.66, 625.26, 102, 488, 489.5

[56] References Cited

U.S. PATENT DOCUMENTS

| | | | |
|---|---|---|---|
| 3,403,699 | 10/1968 | Fites | 137/327.5 |
| 3,512,560 | 5/1970 | Weise | 137/102 |
| 3,848,630 | 11/1974 | Weise . | |
| 4,425,938 | 1/1984 | Papa et al. . | |
| 4,442,860 | 4/1984 | Taylor . | |
| 4,445,531 | 5/1984 | Powell . | |
| 4,559,970 | 12/1985 | Taylor et al. . | |
| 4,586,533 | 5/1986 | Estes . | |
| 4,664,151 | 5/1987 | Piet | 137/625.69 |
| 4,768,539 | 9/1988 | Pringle . | |
| 4,848,397 | 7/1989 | Bickford et al. | 137/489 X |
| 5,027,852 | 7/1991 | McNeely | 137/627.5 X |
| 5,213,133 | 5/1993 | Ellett . | |
| 5,590,684 | 1/1997 | Alberts et al. . | |
| 5,738,333 | 4/1998 | Cognevich et al. | 137/489.5 X |

*Primary Examiner*—Denise L. Ferensic
*Assistant Examiner*—Ramyar Farid
*Attorney, Agent, or Firm*—Robert J. Pugh; Patrick J. Viccaro

[57] ABSTRACT

A non-flowing pilot operated relief valve system having modulating action includes a relief valve and a pilot valve. The pilot valve includes a body forming a channel, an inlet port, a control port, and a vent port. A portion of the channel forms an inlet chamber in communication with the inlet port. A piston is axially movable within the channel and has a vent-valve seat communicating the control port and the vent port. A spool extends through the sleeve and is substantially coaxial with the piston. The spool is axially movable within the channel in response to fluid pressure within the inlet chamber. The spool has an inlet-valve seal member closable on the inlet-valve seat and a vent-valve seal member closable on the vent-valve seat. The spool is adapted such that the inlet-valve seal member is seated on the inlet-valve seat when the a vent-valve seal member is unseated from the vent-valve seat. The spool and the body cooperate to form a first restriction therebetween which communicates the control port with the vent-valve seat and to form a second restriction therebetween which communicates the inlet-valve seat with the control port. A spring biases the piston toward the spool to move the vent-valve seat toward the vent-valve seal member. The piston is movable in response to fluid pressure within the channel between the first restriction and the vent valve-valve seat which acts on the effective area of the piston.

20 Claims, 6 Drawing Sheets

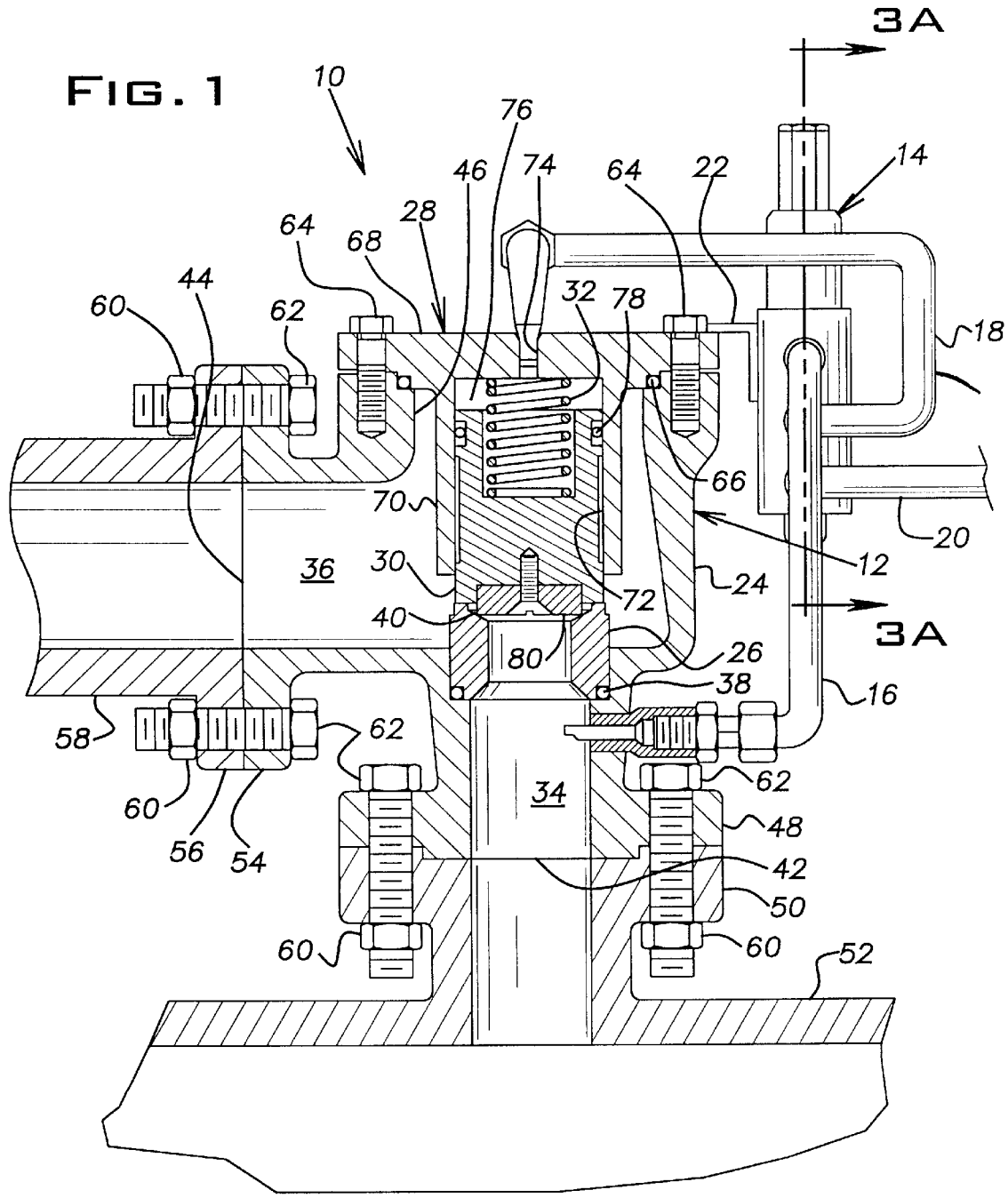

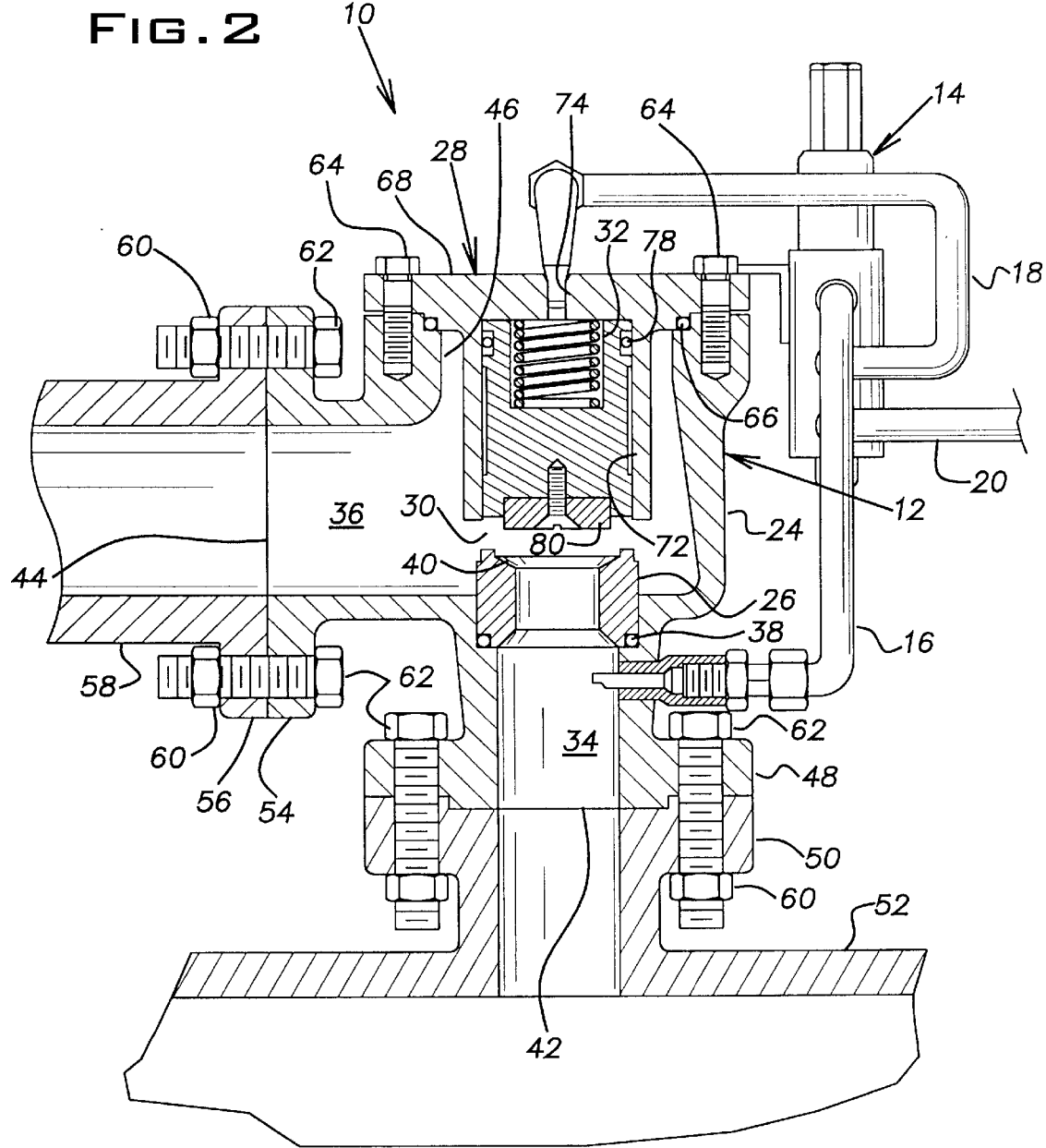

MODULATING ACTION NON-FLOWING PILOT OPERATED RELIEF VALVE

BACKGROUND OF THE INVENTION

The present invention generally relates to fluid pressure relief valves of the type operated by a pilot valve and, more particularly, to pilot operated relief valves of the non-flowing type.

A safety pressure-relief system typically includes a relief or main valve mounted over a pressure vessel, such as a tank or flow line, and a pilot valve which controls operation of the main valve. The main valve moves to an open position when the fluid pressure within the vessel rises above a predetermined set value to relieve or reduce the fluid pressure within the vessel and moves back to a closed position when the fluid pressure within the vessel is reduced below the set value.

Preferably, the pilot valve is of a non-flowing type wherein no system fluid flows through the pilot valve when the main valve is in a static condition below the set value or open and flowing. Non-flowing pilot valves typically have a higher sensitivity and a faster response to pressure changes in the fluid as compared with pilot valves having a continuous fluid flow therethrough. Additionally, these pilot valves may have superior operation when the relief valve is returned to its closed position because the pilot valve is not influenced by flowing system fluid.

Typically, the fast response of these pilot valves is obtained by a snap or pop action of valve elements. For example, see U.S. Pat. No. 3,664,362, disclosing a non-flowing type pilot valve, the disclosure of which is expressly incorporated herein by reference in its entirety. Fluid flows through the pilot valve and changes a dome pressure of the main valve to activate a fluid pressure responsive element, such as a piston or diaphragm. The valve elements are quickly snapped to a full open condition.

This fast response, however, may at times need to be limited. For example, pressure spikes or extremely short duration rises in pressure may cause system fluid to be discarded due to the fast reaction of the pop-action valve elements. Thus, the fast reaction may be too fast and result in an excessive loss of system fluid, that is, a greater volume of system fluid than is required to reduce the system pressure back to the set value. This excessive loss of system fluid is particularly a concern when a relatively expensive system fluid is discarded.

There have been prior attempts to solve this problem by forming non-flowing pilot valves with modulating action, that is, the relief valve is partially opened an amount in proportion to the magnitude of the overpressure. For example, see U.S. Pat. No. 4,586,533, disclosing a non-flowing type pilot valve, the disclosure of which is expressly incorporated herein by reference in its entirety. While these pilot valves have provided some modulating action, the amount the relief valve opens is still not proportional to the magnitude of the overpressure in a substantially linear manner. Accordingly, there is a need in the art for a non-flowing pilot operated relief valve which provides improved modulating action.

SUMMARY OF THE INVENTION

The present invention provides a non-flowing pilot valve which overcomes at least some of the above-described problems of the related art. The pilot valve includes a body having an inlet port, a control port, a vent port, and an inlet chamber in communication with the inlet port. An inlet valve seat communicates the inlet port and the control port. A piston is movable within the body and has a vent-valve seat communicating the control port and the vent port. A spool is movable within the body in response to fluid pressure within the inlet chamber. The spool has an inlet-valve seal member closable on the inlet-valve seat and a vent-valve seal member closable on the vent-valve seat. Preferably, the pilot valve further including means for biasing the piston toward the spool to move the vent-valve seat toward the vent-valve seal member.

BRIEF DESCRIPTION OF THE SEVERAL VIEWS OF THE DRAWING

These and further features of the present invention will be apparent with reference to the following description and drawings, wherein:

FIG. 1 is an elevational view, in partial cross-section, of pressure relief valve system having a relief valve and a pilot valve according to the present invention, wherein the relief valve is shown in a closed position;

FIG. 2 is an elevational view, in partial cross-section, of the relief valve system of FIG. 1, wherein the relief valve is in a relieving position;

DETAILED DESCRIPTION OF PREFERRED EMBODIMENTS

Figure 3A:
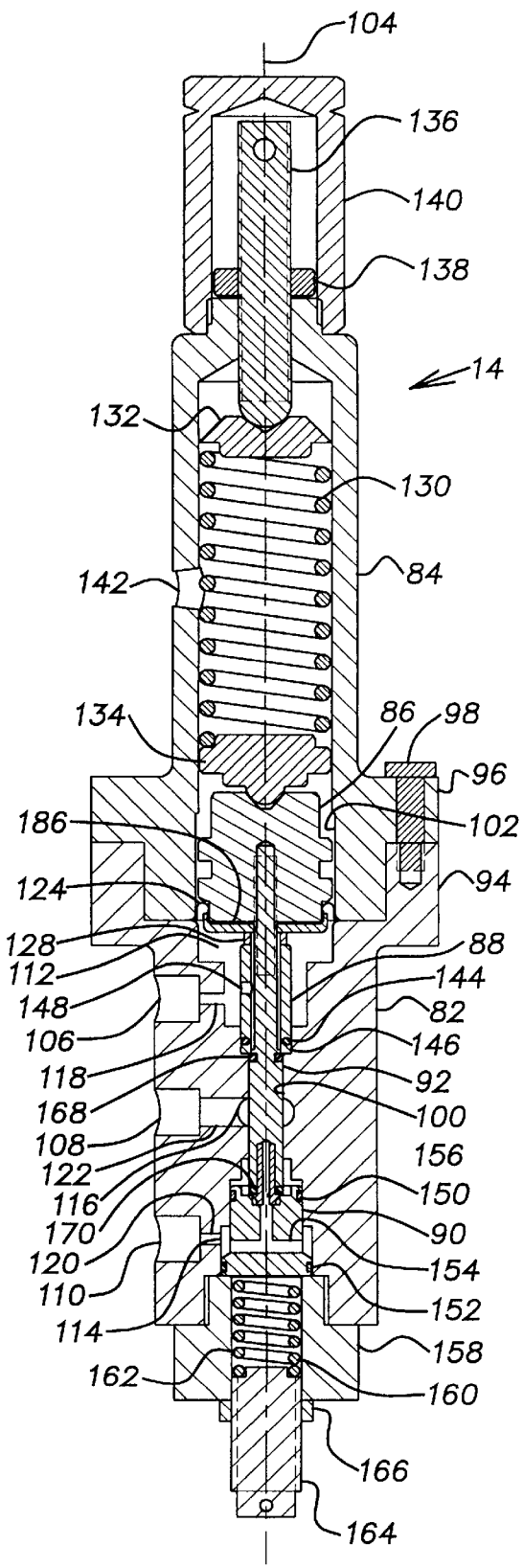
FIG. 3A is an enlarged sectional view, taken along line 3—3 of FIG. 1, showing a first embodiment of the pilot valve, wherein lines connecting relief valve and the pilot valve are removed for clarity.

FIG. 1 illustrates a pilot-operated pressure-relief valve system 10 according to the present invention. The pressure-relief valve system 10 includes a main or relief valve 12, a pilot valve 14, an inlet line or tube 16 extending between the relief valve 12 and the pilot valve 14, a control line or tube 18 extending between the relief valve 12 and the pilot valve 14, and a discharge line or tube 20 extending from the pilot valve 14. Additionally, a support 22 is preferably provided which secures the pilot valve 14 to the relief valve 12.

The relief valve 12 is preferably of conventional construction including a body 24 forming a hollow interior cavity, a nozzle element 26, a cap or cover 28, a piston 30, and a compression spring 32. The nozzle element 26 is secured to the body 24 within the interior cavity and divides the interior cavity into a first or inlet chamber 34 and a second or outlet chamber 36. The nozzle element 26 is secured to the body 24 in any suitable manner such as, for example, the illustrated press fit. A suitable seal member 38 such as, for example, the illustrated o-ring is provided between the nozzle element 26 and the body 24 to form a fluid-tight seal therebetween. One end of the nozzle element 26, which faces the outlet chamber 36, forms an annularly-shaped valve seat 40.

The body 24 has a first or lower opening 42 in communication with the inlet chamber 34, a second or side opening 44 in communication with the outlet chamber 36, and a third or upper opening 46 in communication with the outlet chamber 36. The first opening 42 has a first flange 48 which is sealingly connected to an outlet flange 50 of a pressure vessel or tank 52 holding a pressurized fluid. The second opening 44 has a second flange 54 which is sealingly connected to an inlet flange 56 of a discharge line or pipe 58. The flanges 48, 50, 54, 56 are sealingly connected in any suitable manner such as, for example, the illustrated nut 60 and bolt 62 combinations.

The third opening 46 is closed by the cover 28. The cover 28 is secured to the body 24 by any suitable manner such as, for example, the illustrated threaded fasteners 64. A suitable seal member 66 such as, for example, the illustrated o-ring is preferably provided between the body 24 and the cover 28 to form a fluid-tight seal therebetween.

The cover 28 includes a generally planar wall portion 68 which closes the third opening 46 and an tubularly-shaped sleeve portion 70 which perpendicularly extends from the wall portion 68 into the outlet chamber 36 and defines a cylindrically-shaped bore 72. One end of the bore 72 is open and faces the valve seat 40 of the nozzle element 26 and the other end is closed except for a port 74 extending through the wall portion 68.

The piston 30 is mounted for reciprocal movement within the bore 72 and has a hollow end facing the wall portion 68. The piston 30 cooperates with the cover 28 to form a dome chamber 76 therebetween. A suitable seal member 78 is mounted in an annular groove about the piston 30 and rides in sealing relationship with the wall of the bore 72 as the piston 30 moves within the bore 72. Mounted on an end of the piston 30 facing the valve seat 40 is a valve seat seal 80 arranged to seal the nozzle element 26 when engaging the valve seat 40. The valve seat seal 80 is attached to the piston 30 in any suitable manner such as, for example, the illustrated retainer and threaded fastener.

The compression spring 32 is located within the dome chamber 76 between the hollow end of the piston 30 and the wall portion 68 of the cover 28. The spring 32 biases the piston 30 toward the nozzle element 26 with the valve seat seal 80 in sealing contact with valve seat 40 to prevent fluid flow between the inlet and outlet chambers 34, 36.

Figure 4A:
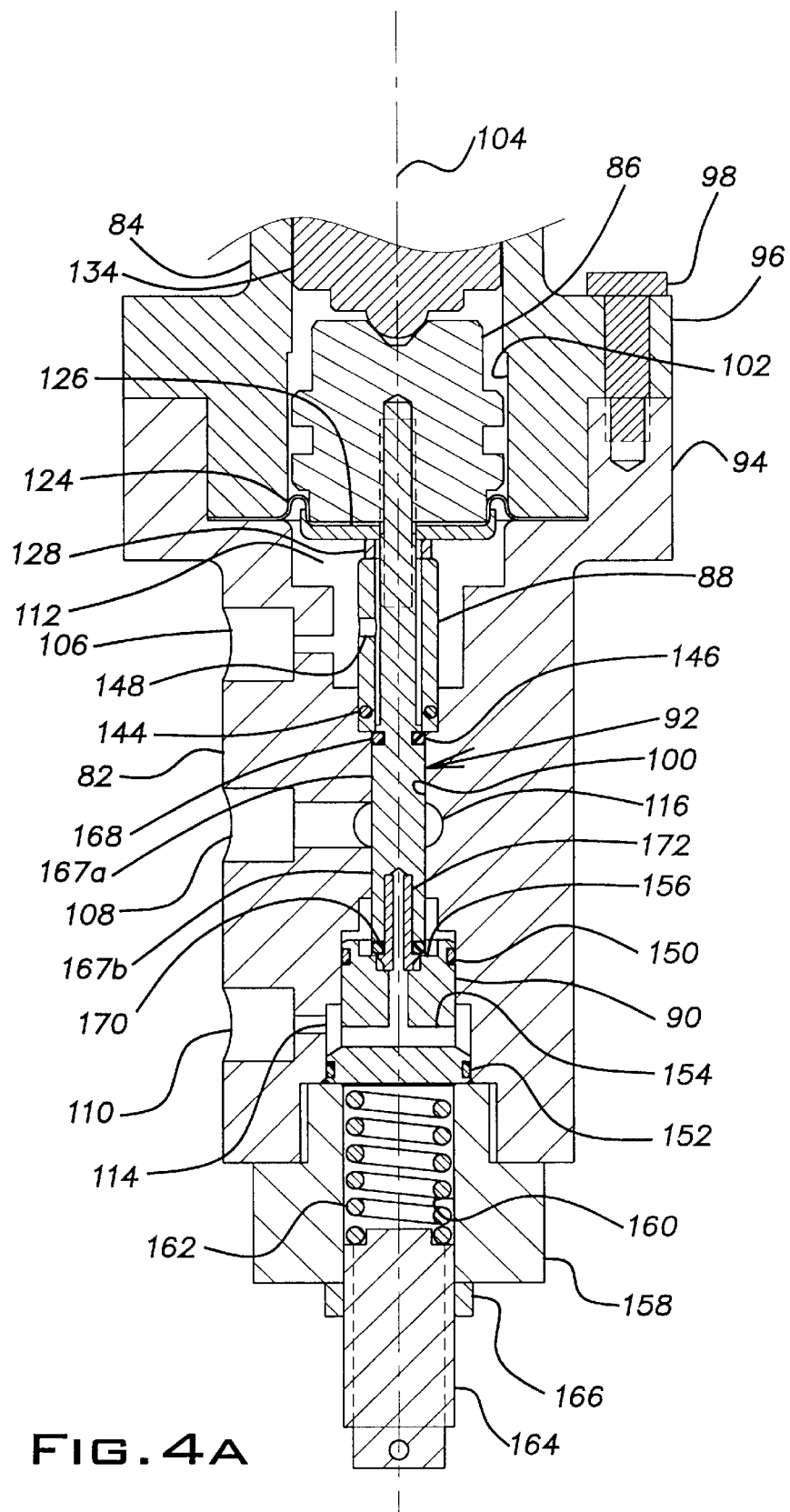
FIG. 4A is an enlarged fragmentary view of a portion of the pilot valve of FIG. 3A.

As best shown in FIGS. 3A and 4A, the pilot valve 14 has a valve body including a main body 82 and a bonnet 84 attached to the main body 82. The pilot valve also includes a movable upper piston 86 generally within the bonnet 84, a sleeve 88 attached to the main body 82, a movable lower piston 90 within the main body 82, and a spool 92 extending within the main body 82 and movable with the upper piston 86.

The main body 82 and the bonnet 84 each have flanges 94, 96 adapted to cooperate in a plug-and-socket like manner, that is, a portion of the bonnet flange 96 is preferably received within an upward facing recess formed in the top of the main body flange 94. A plurality of threaded fasteners 98 downwardly extend through openings in the bonnet flange 96 and into threaded blind holes located in the main body flange 94 to secure the main body flange 94 and the bonnet flange 96 together. The main body 82 and the bonnet 84 are provided with vertically extending channels or bores 100, 102 having a common central axis 104. The bores 100, 102 preferably have a circular cross-section and cooperate with one another as described in more detail hereinafter.

The main body 82 has an upper or inlet port 106, an intermediate or control port 108, and a lower or vent port 110 which are each substantially perpendicular to the central axis 104 and in fluid flow communication with the main body bore 100. The bore 100 of the main body 82 includes an inlet chamber 112 located generally at the top of the bore 82, a discharge or vent chamber 114 located generally at the bottom of the bore 82, and a control chamber 116 located between and spaced-apart from the inlet and the vent chambers 112, 114. The inlet chamber 112 has an upper portion which is generally sized and shaped to match the bonnet bore 102 and a lower portion having an outer diameter smaller than the outer diameter of the upper portion. A first radially extending passage 118 connects the inlet port 106 with the lower portion of the inlet chamber 112. The vent chamber 114 has an upper portion, a central portion, and a lower portion. The central portion of the vent chamber 114 has an outer diameter larger than the outer diameter of the upper portion to form an upper stop or abutment for the lower piston 90. The lower portion of the vent chamber 114 has an outer diameter larger than the outer diameter of the central portion. A second radially extending passage 120 connects the vent port 110 with the lower portion of the vent chamber 114. A third radially extending passage 122 connects the control port 108 with the control chamber 116.

The movable upper piston 86 is slidably received in the bore 102 of the bonnet 84. A diaphragm 124 of suitable flexible material is secured to the lower end of the upper piston 86 by a diaphragm retainer 126 and nut 128. The outer edge of the diaphragm 124 is clamped between the main body 82 and the bonnet 84. Arranged in this manner, the system pressure, which is continually present in the inlet chamber 112, is applied to the effective area of the upper piston 86 to move it in an upward direction.

An upper compression spring 130 is located within the bore 102 of the bonnet 82 between opposed upper and lower spring followers 132, 134. The lower spring follower 134 engages the top of the upper piston 86 so that the upper compression spring 130 applies a downward bias or force on the upper piston 86. A threaded adjustment screw 136 extends through a threaded opening at the top of the bonnet 84 and engages the upper spring follower 132. Longitudinal movement of the adjustment screw 136 adjusts the loading of the upper compression spring 130. A lock nut 138 is provided which secures or locks the adjustment screw 136 in its longitudinal position once a desired force is applied by the upper compression spring 130 to the upper piston 86. A removable cap 140 covers the otherwise exposed top portion of the adjustment screw 136 to provide protection thereto. The cap 140 has internal threads which cooperate with external threads at an upper end of the bonnet 84 to secure the cap 140 to the bonnet 84. A suitable vent hole 142 is provided in the cap 140 for movement of the upper piston 86.

The sleeve 88 is tubularly-shaped having open upper and lower ends and is located in the inlet chamber 112 substantially coaxial with the bore 100. The sleeve 88 is attached to the main body 82, preferably by a loose or friction-fit within a counterbore located at the bottom of the inlet chamber 112 so that the sleeve 88 is floating and/or self-aligning. A seal member 144, such as the illustrated o-ring, is located between the sleeve 88 and the main body 82 to provide a fluid-tight seal therebetween.

An inlet valve seat 146 is formed at the lower end of the sleeve 88 and therefore is located at the bottom of the inlet chamber 112. The sleeve 88 is sized such that the nut 128 generally closes the upper end of the sleeve 88 when the upper piston 86 is in a downward most position and provides a lower stop or abutment for the upper piston 86. At least one opening 148 is provided in the sleeve 88 to communicate the portion of the inlet chamber 112 surrounding the sleeve 88 and the portion of the inlet chamber 112 within the sleeve 88.

The movable lower piston 90 is slidably received in the vent chamber 114 of the main body bore 100. The lower piston 90 has a top portion sized and shaped to cooperate with the central portion of the vent chamber 114 and a bottom portion sized and shaped to cooperate with the bottom portion of the vent chamber 114. The periphery of the lower piston top and bottom portions are each provided with a seal member 150, 152 such as the illustrated o-ring which provides a fluid-tight seal between the top and bottom portions of the lower piston 90 and the central and bottom portions of the vent chamber 114 respectively.

The lower piston 90 is provided with an inner passage 154 for selectively communicating the portion of the vent chamber 114 located above the lower piston 90 with the portion of the vent chamber 114 adjacent the lower piston 90 and between the seal members 150, 152. A vent valve seat 156 is formed in the passage 154 at the upper end of the lower piston 90 and therefore is located at the top portion of the vent chamber 114. The inner passage 154 preferably includes a generally vertical portion substantially coaxial with the central axis 104 and at least one horizontal portion substantially perpendicular to the central axis 104. The horizontal portion of the inner passage 154 is located between the seal members 150, 152.

A plug 158 is threadably secured to the lower end of the main body 82 which forms a lower stop or abutment for the lower piston 90 and at least partially closes the central bore 100. The plug 158 is provided with a central bore 160 which is generally coaxial with the bore 100 of the main body 82.

Preferably, means for biasing the lower piston 90 toward the spool 92 are provided to move the vent-valve seat 156 toward the vent-valve seal member 170. The biasing means preferably includes a lower compression spring 162 located within the bore 160 of the plug 158. It is noted however that the biasing means can include other suitable means for applying a force such as, for example, other types of mechanical springs or fluid pressure. The top of the lower compression spring 162 engages the bottom of the lower piston 90 so that the lower compression spring 162 applies a upward bias or force on the lower piston 90. A threaded adjustment screw 164 extends through a threaded opening at the bottom of the plug 158 and engages the bottom of the lower compression spring 162. Longitudinal movement of the adjustment screw 164 adjusts the loading of the lower compression spring 162. A lock nut 166 is provided which secures or locks the adjustment screw 164 in its longitudinal position once a desired force is applied by the lower compression spring 162 to the lower piston 90.

The spool 92 is located within the bore 100 and extends from the inlet chamber 112 to the vent chamber 114. The spool 92 is rigidly secured to the upper piston 86 for reciprocal movement therewith along the central axis 104. The spool 92 preferably has an externally threaded upper end which cooperates with a blind threaded hole in the bottom of the upper piston 86. The threaded upper end of the spool 92 also cooperates with the diaphragm retainer and nut 126, 128 to clamp the diaphragm 124 to the bottom of the upper piston 86.

The spool 92 has an upper portion sized and shaped to loosely extend through the sleeve 88 to form a space therebetween. The spool 92 also has a lower portion sized and shaped to closely extend through the portion of the bore 100 connecting the inlet chamber 112 and the vent chamber 114 to form a tight clearance therebetween. Therefore, there is a first or upper tight clearance or restriction 167a between the inlet chamber 112 and the control chamber 116 and a second or lower tight resistance or restriction 167b between the control chamber 116 and the vent chamber 114.

The spool 92 carries an inlet-valve disc or seal member 168 for closing the inlet-valve seat 146 and a vent-valve disc or seal member 170 for closing the vent-valve seat 156. The seal members 168, 170 are located such that the inlet-valve is closed when the vent valve is open. Therefore, a non-flowing type pilot valve is formed.

The seal members 168, 170 preferably include o-rings secured to the spool 92 in an appropriate manner. The inlet-valve seal member 168 preferably encircles the spool 92 and is located generally between the upper and lower portions of the spool 92. The vent-valve seal member 170 is preferably secured to the lower end of the spool 92 with a retainer 172 threadably secured to the lower end of the spool 92.

Figure 3B:
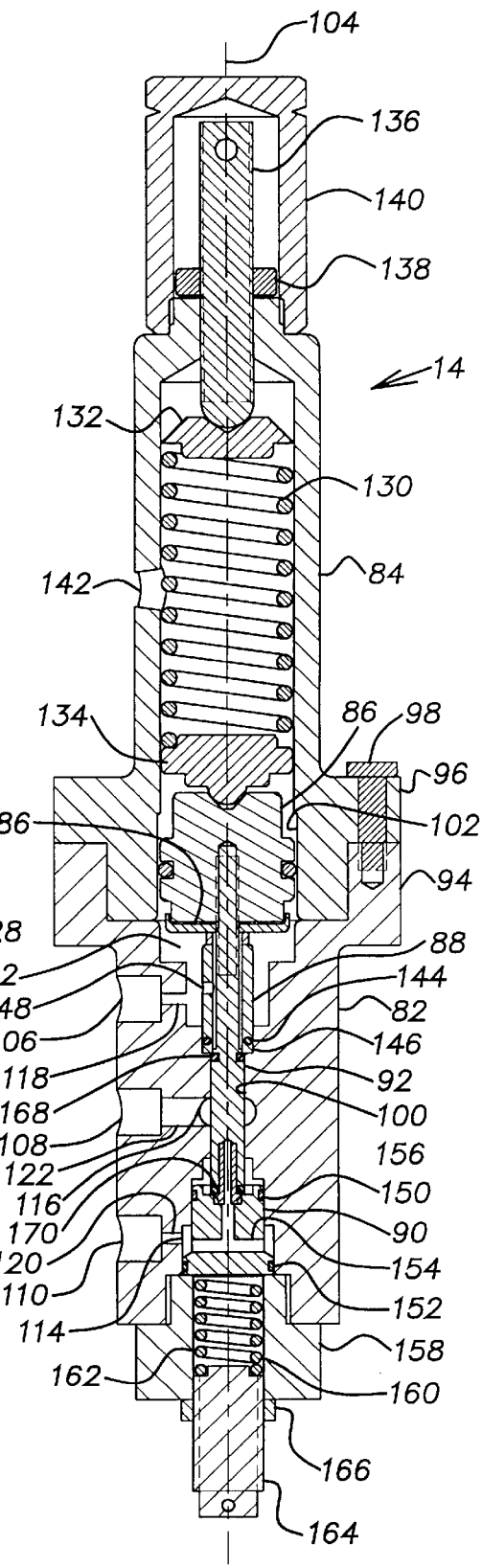
FIG. 3B is an enlarged sectional view, taken along line 3—3 of FIG. 1, showing a second embodiment of the pilot valve, wherein connecting lines are removed for clarity.
Figure 4B:
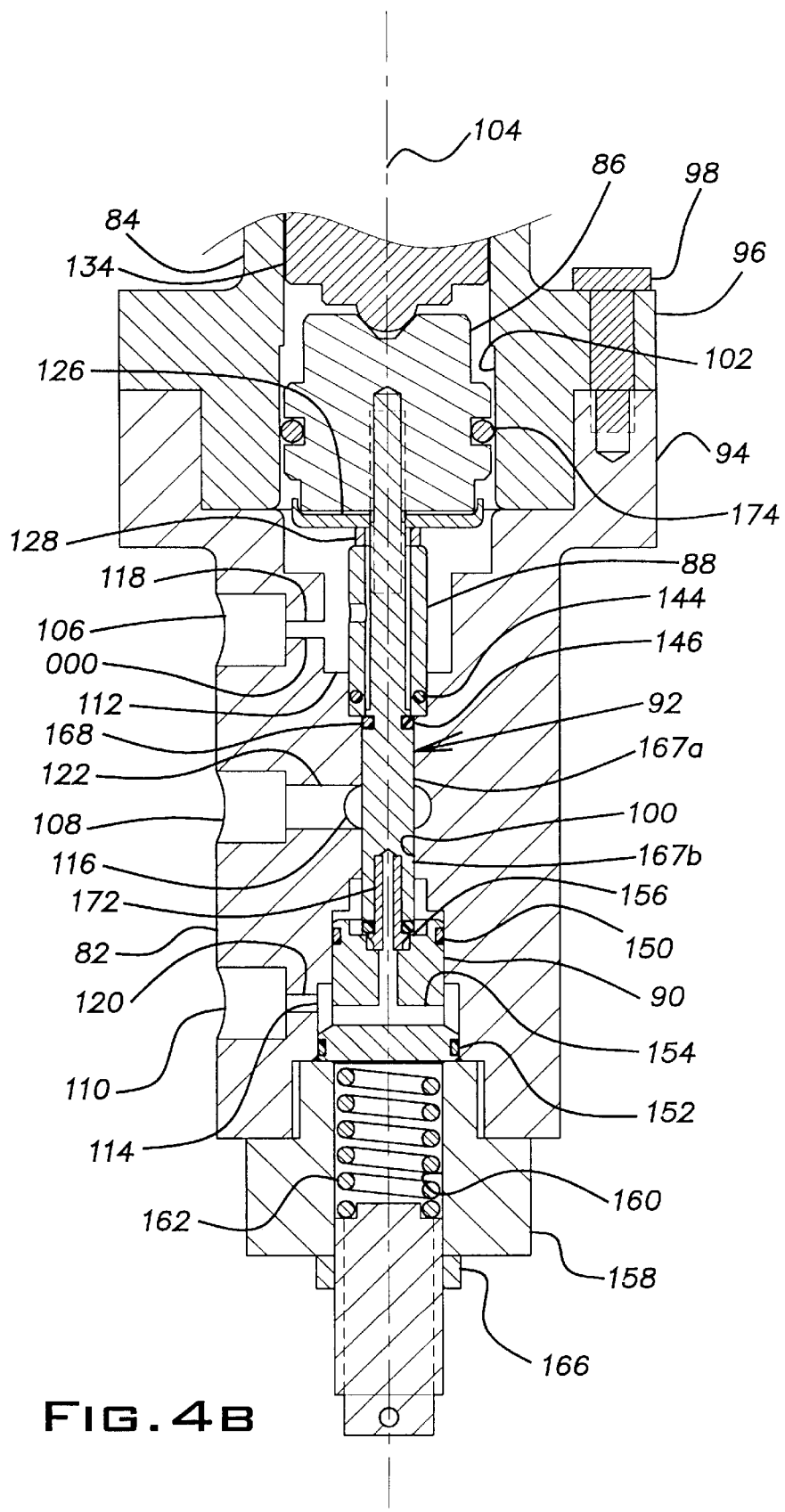
FIG. 4B is an enlarged fragmentary view of a portion of the pilot valve of FIG. 3B.

FIGS. 3B and 4B illustrate a second embodiment of the pilot valve 14 according to the present invention, wherein like reference numbers are used for like structure. The second embodiment is substantially the same as the first embodiment described hereinabove, except that the diaphragm 124 is replaced with a seal member 174 encircling the periphery of the upper piston 86 which provides a seal between the upper piston 86 and the bore 102. Preferably, the seal member 174 is an o-ring. The seal member 174 is preferably used (and the diaphragm 124 is omitted) for relatively high set pressures where it may be desirable to utilize the smaller effective area of the seal member 174. The diaphragm 124 is used (and the seal member 174 is omitted) for relatively low set pressures where it may be desirable to utilize the larger effective area of the diaphragm 124.

As best shown in FIGS. 1, 2, and 3A, the inlet line or tube 16 extends from the main valve 12 to the pilot valve 14. The inlet line 16 is in fluid communication with the inlet chamber 34 of the main valve 12 via a pressure pick-up extending into the inlet chamber 34 and is in fluid communication with the inlet chamber 112 of the pilot valve 14 via the inlet port 106 and first passage 118.

The control line or tube 18 extends from the main valve 12 to the pilot valve 14. The control line 18 is in fluid communication with the dome chamber 76 of the main valve 12 via the dome port 74 in the main valve cover 28 and is in fluid communication with the control chamber 116 of the pilot valve 14 via the control port 108 and the third passage 122.

The discharge line or tube 20 extends from the pilot valve 14 to a drain or container (not specifically shown) wherein fluid can be disposed or recovered. The discharge line 20 is in fluid communication with the vent chamber 114 of the pilot valve 14 via the vent port 110 and the second passage 120.

As best shown in FIG. 1, the valve system 10 automatically maintains fluid in the pressure tank 52 at a desired system pressure during operation. When the pressure tank 52 is at the desired system pressure, the piston seat seal 80 of the main valve 12 is sealingly engaged with the valve seat 40 of the nozzle element 26 to prevent flow of fluid from the main valve inlet chamber 34 to the main chamber 36.

As best shown in FIG. 4A, the inlet chamber 112 of the relief valve 14 is also at system pressure because of fluid communication through the pressure pickup and the inlet line 16. The system pressure in the inlet chamber 112 is exerted on the effective area of the upper piston 86. The downward force exerted by the upper compression spring 130, however, maintains the upper piston 86 and the spool 92 in a downward position wherein the vent-valve seal member 170 sealingly closes the vent-valve seat 156 and the inlet-valve seal member 168 is separated from the inlet-valve seat 146. The upper compression spring 130 is adjusted so that the system pressure overcomes the downward force to upwardly move the upper piston 86 and the spool 92 when the system pressure increases to a predetermined pressure greater than the desired system pressure or set pressure as discussed in more detail hereinafter. It is noted that when the upper piston 86 and the spool 92 are in their downward most position as just described, the nut 128 preferably engages the top of the sleeve 88. The lower piston 90 is also in its downward most position engaging the top of the plug 158 when pressure is at its normal level.

The control chamber 116 of the relief valve 14 is also at system pressure because of fluid communication through the upper restriction 167a, between the spool 92 and the bore 100, located between the inlet chamber 112 and the control chamber 116. Additionally, there is fluid communication through the lower restriction 167b, between the spool 92 and the bore 100, located between the control chamber 116 and the discharge chamber 114. Therefore, fluid located in the control chamber 116 below the lower restriction 167b and directly above the lower piston 90 acts on the effective area of the upper end of the lower piston 90 to provide a downward force thereon. No fluid communication is present through the inner passage 154 of the lower piston 90 however, because the vent-valve seal member 170 is closing the vent-valve seat 156.

The dome chamber 76 of the main valve 12 is also at system pressure because of fluid communication between the control chamber 116 of the pilot valve 14 and the dome chamber 76 through the control line 18. The pressure in the dome chamber 76 along with the compression spring 32 exert a downward force on the piston 30 to ensure that the piston seat seal 80 remains sealingly engaged with the valve seat 40 of the nozzle element 26 to prevent flow of fluid through the relief valve 12.

An increase in fluid pressure in the pressure tank 52 results in an increase in system pressure in the inlet chamber 112 of the pilot valve 14 and causes upward movement of the upper piston 86 and the spool 92 if the downward force of the upper compression spring 130 is overcome, that is, when the system pressure reaches the predetermined level or the set pressure. The upward movement of the spool 92 seats the inlet-valve seal member 168 on the inlet valve seat 146, wherein fluid communication between the between the inlet chamber 112 and the control chamber 116 is stopped, and unseats the vent-valve seal member 170 from the vent-valve seat 156, wherein fluid communication through the lower piston 90 is started.

As the vent-valve seal member 170 is unseated, fluid in the control chamber 116 below the lower restriction 167b and above the lower piston 90, is released through the vent-valve seat 156 and the inner passage 154 of the piston 90 to the discharge port 110. From the discharge port 110, the fluid is discharged from the pilot valve 14 through the discharge line 20. Fluid in the control chamber 116, and the dome chamber 76 of the main valve 12, is also released in a similar manner because the control chamber 116 is in fluid communication with the upper portion of the discharge chamber 114 through the lower restriction 167b. It is noted, however, that flow through the lower restriction 167b is purposely slow as described in more detail herein after.

When the spool 92 is moved upward with the upper piston 86, the lower piston 90 along with the vent-valve seat 156 can rise due to the upward force of the lower compression spring 160. Travel of the lower piston 90 is controlled by the lower compression spring 160 and the fluid pressure in the control chamber below the lower restriction 167b which acts on the effective area of the lower piston 90. It can be seen that the greater the fluid pressure acting on the top of the lower piston 90, the greater the opening of the vent valve. It is noted that the predetermined force of the lower compression spring 160 can be adjusted as described hereinabove. This travel of the vent-valve seat 170 together with the lower restriction 167b cause the fluid pressure in the control chamber 116 of the pilot valve 14 and the dome chamber 76 of the main valve 12 to depressurize slowly and creates the desired modulating action.

As best seen in FIG. 2, the release of fluid from the dome chamber 76 of the main valve 12 out of the discharge port 110 of the pilot valve 14 results in a depressurization of the dome chamber 76. Due to this pressure reduction, the fluid pressure in the inlet chamber 34 of the main valve 12 raises the piston 30 to an open or unseated position and thereby allows fluid to flow from the main valve inlet chamber 34 to the outlet chamber 36. This passage of fluid through the main valve 12 from the tank 52 to the pipe 58 reduces the pressure in the tank 52, that is, the system pressure.

Once the system pressure is reduced to a predetermined blow down or closing pressure, the downward force of the upper compression spring 130 downwardly moves the upper piston 86 and the spool 92. The downward movement of the spool 92 unseats the inlet-valve seal member 168 from the inlet valve seat 146, wherein there is again fluid communication between the inlet chamber 112 and the control chamber 116, and seats the vent-valve seal member 170 on the vent-valve seat 156, wherein there is no longer fluid communication through the lower piston 90 to the discharge port.

The return of fluid communication between the inlet chamber 112 and the control chamber 116 through the upper restriction 167a allows the control chamber, and thus the dome chamber 76 of the main valve 12, to slowly return to system pressure. As best shown in FIG. 1, the pressurization of the dome chamber 76 along with the bias of the spring 32 returns the piston 30 to a closed or seated position to prevent further fluid flow from the inlet chamber 34 to the outlet chamber 36.

Figure 5:
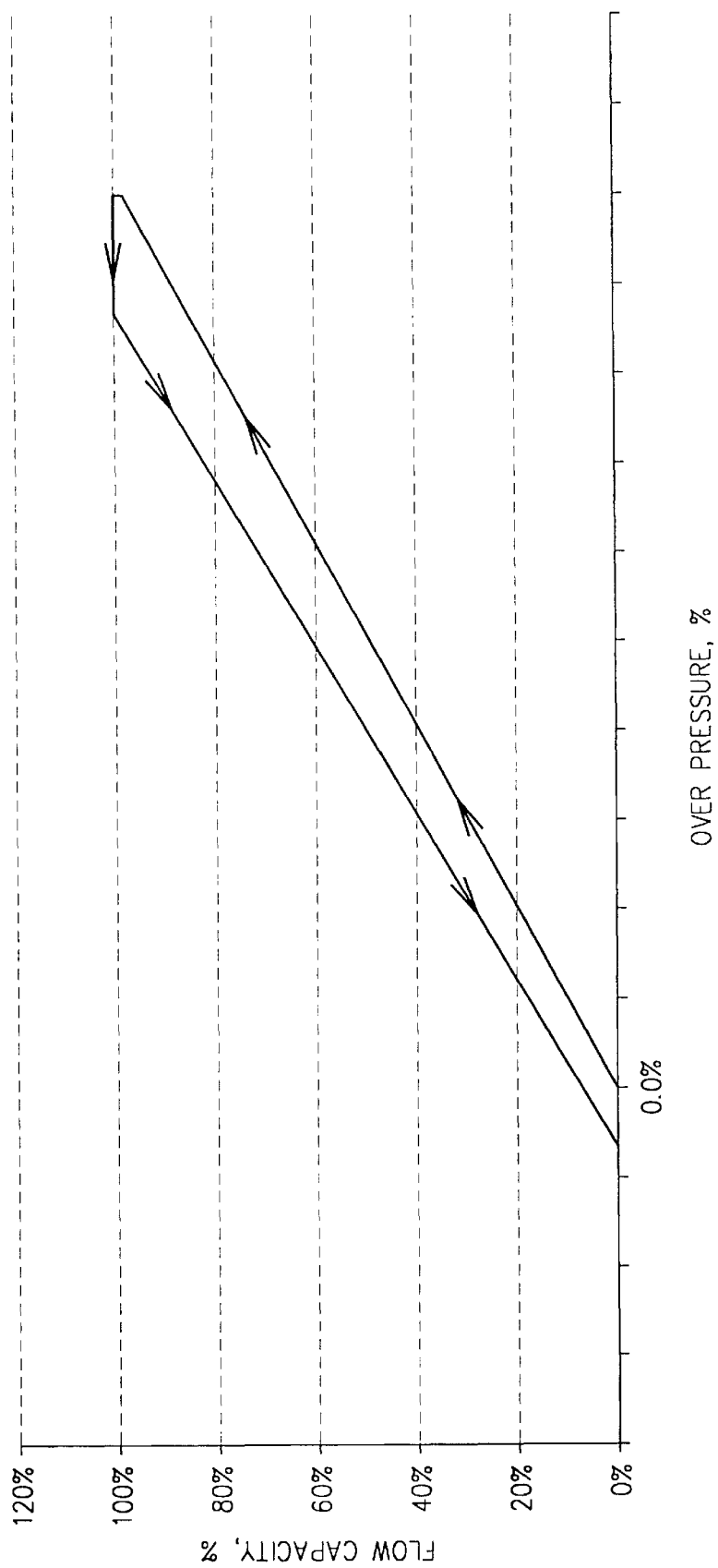
FIG. 5 is a graphical illustration of modulating action of the relief valve.

As diagrammatically shown in FIG. 5, the valve system of the present invention provides a relatively small system hysteresis, that is, failure to exactly return the system pressure to the desired system pressure or overcorrection of the system pressure. This relatively small overcorrection, compared to prior art systems, reduces the amount of fluid discharged or lost to maintain the desired system pressure in the tank 52. This is made possible by slow controlled pressurization and depressurization. Note that flow capacity (shown as a percentage of maximum theoretical flow) through the main valve 12 from the pressure tank 52 to the discharge pipe 58 linearly increases and decreases in proportion to the overpressure (shown as a percentage of the desired system pressure) of the pressure tank 52.

From the foregoing, it can be seen that the modulating action of the pressure relief system 10 is proportionally responsive to the overpressure of the pressure tank 52 so that the system 10 vents only an amount of system fluid which is necessary to eliminate the overpressure, thereby reducing excessive loss of system fluid.

Although particular embodiments of the invention have been described in detail, it will be understood that the invention is not limited correspondingly in scope, but includes all changes and modifications coming within the spirit and terms of the claims appended hereto.

What is claimed is:

1. A pilot valve comprising:
   a body having an inlet port, a control port, and a vent port, an inlet chamber in fluid-flow communication with said inlet port, a control chamber in fluid-flow communication with said control port, and a vent chamber in fluid-flow communication with said vent port;
   an inlet-valve seat located between said inlet chamber and said control chamber to control fluid flow between said inlet chamber and said control chamber;
   a piston movable within said body in response to fluid pressure acting thereon and having a vent-valve seat located between said control chamber and said vent chamber to control fluid flow between said control chamber and said vent chamber; and
   a spool movable within said body in response to fluid pressure within said inlet chamber, said spool having an inlet-valve seal member closable on said inlet-valve seat and a vent-valve seal member closable on said vent-valve seat, said spool and said body cooperating to form a first restriction therebetween and located between said control chamber and said vent-valve seat to slow fluid flow from said control chamber to a space between said first restriction and said piston.

2. The pilot valve according to claim 1, wherein said inlet-valve seal member is spaced apart a fixed distance from said vent-valve seal member.

3. The pilot valve according to claim 1, further including means for biasing said vent-valve seat toward said vent valve seal member.

4. The pilot valve according to claim 3, wherein said biasing means is adjustable.

5. The pilot valve according to claim 3, wherein said biasing means applies a predetermined force.

6. The pilot valve according to claim 3, wherein said biasing means includes a compression spring.

7. The pilot valve according to claim 1, wherein said first restriction includes an annular-shaped passage formed between a cylindrical-shaped portion of said spool and a bore formed within said body.

8. The pilot valve according to claim 1, wherein said piston is movable in response to fluid pressure within said space between said first restriction and said piston.

9. The pilot valve according to claim 1, wherein said spool and said body cooperate form a second restriction therebetween and located between said inlet-valve seat and said control chamber to slow fluid flow from said inlet chamber to said control chamber.

10. The pilot valve according to claim 9, wherein said second restriction includes an annular-shaped passage formed between a cylindrical-shaped portion of said spool and a bore formed within said body.

11. The pilot valve according to claim 1, said inlet-valve seat is fixed to said body to prevent relative movement therebetween during operation of said pilot valve.

12. The pilot valve according to claim 1, wherein a sleeve at least partially extends into said inlet chamber so that a first portion of said inlet chamber surrounds said sleeve and a second portion of said inlet chamber is within said sleeve, said sleeve forms said inlet-valve seat, and said spool extends through said sleeve.

13. A pilot valve comprising:
    a body forming a channel, an inlet port, a control port, and a vent port, a first portion of said channel forming an inlet chamber in fluid-flow communication with said inlet port, a second portion of said channel forming a control chamber in fluid-flow communication with said control port, and a third portion of said channel forming a vent chamber in fluid flow communication with said vent port;
    an inlet valve seat located between said inlet chamber and said control chamber to control fluid flow between said inlet chamber and said control chamber;
    a piston axially movable within said channel in response to fluid pressure within said channel acting thereon and having a vent-valve seat located between said control chamber and said vent chamber to control fluid flow between said control chamber and said vent chamber;
    a spool substantially coaxial with said piston and axially movable within said channel in response to fluid pressure within said inlet chamber, said spool having an inlet-valve seal member closable on said inlet-valve seat and a vent-valve seal member closable on said vent-valve seat, said spool and said channel cooperating to form a first restriction therebetween and located between said control chamber and said vent-valve seat to slow fluid flow from said control chamber to a space in said channel between said first restriction and said piston; and
    means for biasing said piston toward said spool to move said vent-valve seat toward said vent-valve seal member.

14. The pilot valve according to claim 13, wherein said biasing means includes a compression spring.

15. The pilot valve according to claim 13, wherein said first restriction includes an annular-shaped passage formed between a cylindrical-shaped portion of said spool and a cylindrical-shaped portion of said channel.

16. The pilot valve according to claim 15, wherein said spool and said channel cooperate to form a second restriction therebetween and located between said inlet-valve seat and said control chamber to slow fluid flow between said inlet chamber and said control chamber.

17. The pilot valve according to claim 16, wherein said second restriction includes an annular-shaped passage formed between a cylindrical-shaped portion of said spool and a cylindrical-shaped portion of said channel.

18. The pilot valve according to claim 13, wherein said piston is movable in response to fluid pressure within said space in said channel between said first restriction and said piston.

19. The pilot valve according to claim 13, wherein a sleeve at least partially extends into said inlet chamber so that a first portion of said inlet chamber surrounds said sleeve and a second portion of said inlet chamber is within said sleeve, said sleeve forms said inlet-valve seat, and said spool extends through said sleeve.

20. A pilot valve comprising:
    a body forming a channel, an inlet port, a control port, and a vent port, a first portion of said channel forming an inlet chamber in fluid-flow communication with said inlet port, a second portion of said channel forming a control chamber in fluid-flow communication with said control port, and a third portion of said channel forming a vent chamber in fluid flow communication with vent port;
    a sleeve at least partially within said inlet chamber, said sleeve forming an inlet valve seat located between said inlet chamber and said control chamber to control fluid flow between said inlet chamber and said control chamber, said inlet-valve seat being fixed to said body to prevent movement therebetween during operation of the pilot valve;

a piston axially movable within said channel in response to fluid pressure acting thereon and having a vent-valve seat located between said control chamber and said vent vent chamber to control fluid flow between said control chamber and said vent chamber;

a spool extending through said sleeve and substantially coaxial with said piston, said spool axially movable within said channel in response to fluid pressure within said inlet chamber, said spool having an inlet-valve seal member closable on said inlet-valve seat and a vent-valve seal member closable on said vent-valve seat, said inlet-valve seal member being spaced a fixed distance along said spool from said vent-valve seal member, said spool and said channel cooperating to form a first restriction therebetween and located between said control chamber and said vent-valve seat to slow fluid flow between said control chamber and a space in said channel between said first restriction and said piston, said spool and said channel cooperating to form a second restriction located between said inlet-valve seat with said control chamber to slow fluid flow between said inlet chamber and said control chamber, wherein said piston moves in response to fluid pressure within said space in said channel between the first restriction and said piston; and a spring biasing said piston toward said spool to move said vent-valve seat toward said vent-valve seal member.

\* \* \* \* \*